(12) United States Patent
Turkboylari

(10) Patent No.: US 7,313,705 B2
(45) Date of Patent: Dec. 25, 2007

(54) IMPLEMENTATION OF A SECURE COMPUTING ENVIRONMENT BY USING A SECURE BOOTLOADER, SHADOW MEMORY, AND PROTECTED MEMORY

(75) Inventor: Mustafa Turkboylari, Richardson, TX (US)

(73) Assignee: Texas Instrument Incorporated, Dallas, TX (US)

( * ) Notice: Subject to any disclaimer, the term of this patent is extended or adjusted under 35 U.S.C. 154(b) by 672 days.

(21) Appl. No.: 10/335,315

(22) Filed: Dec. 31, 2002

(65) Prior Publication Data

US 2003/0140238 A1 Jul. 24, 2003

Related U.S. Application Data

(60) Provisional application No. 60/351,078, filed on Jan. 22, 2002.

(51) Int. Cl.
| | |
|---|---|
| *G06F 21/00* | (2006.01) |
| *G06F 12/14* | (2006.01) |
| *G06F 21/22* | (2006.01) |
| *G06F 21/24* | (2006.01) |

(52) U.S. Cl. ............ 713/193; 713/190; 713/189; 713/169; 726/12; 726/22; 726/34

(58) Field of Classification Search ............ 713/193; 726/34, 16–20
See application file for complete search history.

(56) References Cited

U.S. PATENT DOCUMENTS

| | | | | |
|---|---|---|---|---|
| 6,363,486 | B1 * | 3/2002 | Knapton, III | 726/7 |
| 6,381,732 | B1 * | 4/2002 | Burnham et al. | 716/8 |
| 6,938,164 | B1 * | 8/2005 | England et al. | 713/193 |
| 2002/0147916 | A1 * | 10/2002 | Strongin et al. | 713/193 |
| 2002/0166062 | A1 * | 11/2002 | Helbig | 713/200 |
| 2003/0005277 | A1 * | 1/2003 | Harding et al. | 713/2 |

OTHER PUBLICATIONS

Gwennap, Linley. "Alpha 21364 to Ease memory Bottleneck" (Oct. 1998) Microdesign Resources.*
A.J. Menezes, P.C. van oorschot, S.A. Vanstone "Handbook of Applied Cryptography" (1997) CRC Press. Section 11.3.1-11.3.3.*

* cited by examiner

*Primary Examiner*—Syed A. Zia
(74) *Attorney, Agent, or Firm*—Steven A. Shaw; F. James Brady; Frederick L. Telecky, Jr.

(57) ABSTRACT

A computer system with a secure bootloading function is disclosed. Security logic (20) is implemented on-chip with a central processing unit (CPU) (10), and performs security functions following a system reset, such as upon power-up or a hardware or software reset. A security key value from a security key store (36), which is read-protected from subsequent read accesses, is used to authenticate each code block associated with secure applications. Write-protect registers (34) store the memory addresses of authenticated code blocks, so that these code blocks cannot be altered. A shadow memory (32) is provided on-chip with the CPU (10), to which access is granted for program instructions having a physical memory address within the memory address ranges stored in the write-protect registers (34), and thus usable by the secure applications. Successful authentication of the user code block ensures that the bootloaded code is not corrupt, prior to passing control to the operating system.

19 Claims, 2 Drawing Sheets

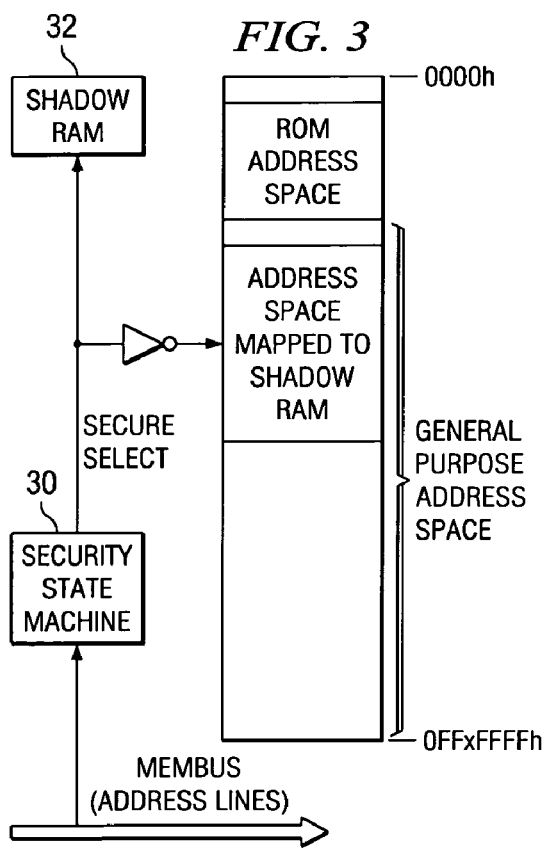
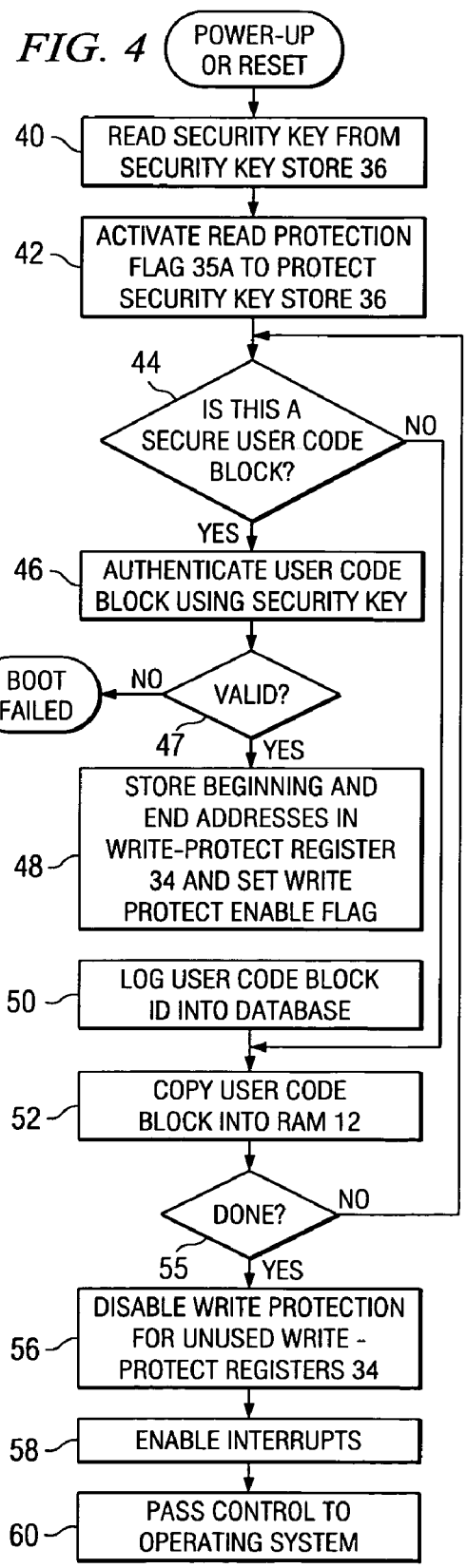

IMPLEMENTATION OF A SECURE COMPUTING ENVIRONMENT BY USING A SECURE BOOTLOADER, SHADOW MEMORY, AND PROTECTED MEMORY

CROSS-REFERENCE TO RELATED APPLICATIONS

This application claims priority, under 35 U.S.C. §119(e), of Provisional Application No. 60/351,078, filed Jan. 22, 2002.

STATEMENT REGARDING FEDERALLY SPONSORED RESEARCH OR DEVELOPMENT

Not applicable.

BACKGROUND OF THE INVENTION

This invention is in the field of computer security, and is more specifically directed to processor architecture with security provisions.

Especially in recent years, the security of computer systems has become an important issue in the computer industry. Operators of computer systems are rightfully concerned about the security of electronically stored information from unauthorized access, especially regarding sensitive and valuable business information. Also as is well known in the art and by the general public, malicious attacks of computer systems by way of computer viruses, and also by way of unauthorized access to computer networks, are also of significant concern. The disruption of computer networks, as well as the destruction of data or loss of secrecy to such data, can cause significant damage to modern business and government entities, not to mention to individual persons. In addition, the computer systems themselves can be compromised by electronic vandalism, so as to be temporarily or permanently disabled.

The issue of computer security concerns has been multiplied by the recent explosion in the widespread implementation and availability of computer-based systems, over a variety of platforms. Advances in computer and integrated circuit manufacturing technologies have permitted the widespread deployment of powerful portable computers, commonly referred to as "notebook" or "laptop" computers. A still-smaller type of computer system that has become popular is the personal digital assistant (PDA), operating according under the PALM operating system or the WindowsCE operating system. These classes of portable computers now often include wireless network capability, for communications to a local area network (LAN) or to the Internet, even in public places such as coffee shops and airport lounges. Of course, this wireless access provides even more vulnerability to unauthorized access.

Many additional electronic devices also now can be considered to be computer systems, although not in the traditional sense. For example, modern wireless telephone handsets are effectively computer systems, under the control of a microprocessor or microprocessor-like central processing unit that accesses local memory. Especially when implemented into the so-called 2.5G and 3G wireless services, these modern wireless telephone handsets carry out computer-like functions including Internet browsing, email functionality, and the like. Other non-traditional computer platforms include Internet appliances, web pads, biometrics, medical devices and the like. An example of a microprocessor device that is optimized for embedded and connected applications such as wireless telephone handsets and these other non-traditional computer systems is the OMAP dual-core processor available from Texas Instruments Incorporated, which combines a TMS320C55x™ DSP core and an enhanced ARM925 processor.

These new computer platform implementations, and their increased connectivity to the Internet, especially using wireless technology, are also vulnerable to security attacks, perhaps more so than conventional desktop computer workstations. In an example of such an attack, malicious emails with malevolent code attachments were broadcast to 2.5G and 3G wireless telephone handsets in Japan. The attacked handsets became controlled by the code, locking up some handsets while causing others to make unauthorized long distance calls; in fact, so many handsets called the emergency telephone numbers as to overwhelm the Japanese emergency response system. These and other security attacks cause significant economic and cultural disruptions.

In general, security breaches in the nature of viruses, worms, "bot" or "zombie" operation, and the like have exacted a significant economic cost on modern communications and computing systems. Significant resources have been developed to improve the security of all computer systems, including conventional computer workstations and also the new platforms containing embedded processors.

By way of further background, conventional computer operating systems generally include some amount of security functionality, to maintain system-level integrity and operability. However, as noted above in connection with the known security breaches, these operating system security features are often overcome by imaginative programming. In addition, the operating system level security applications rely upon the integrity of the underlying operating system itself. If the operating system itself is maliciously altered, then these conventional security approaches are ineffective.

By way of still further background, conventional "bootloader" routines are commonly used in modern computer systems, in virtually all platforms. A typical bootloader is a sequence of instructions for system initialization. The bootloader sequence is typically maintained in "firmware", such as electrically-alterable or hard-coded read-only memory (ROM) in which the stored data persists after power-down. Upon power-up or system reset, the bootloader sequence is executed by the central processing unit (CPU), to transfer operating system user code from another persistent store (e.g., a hard disk drive in a conventional computer, or non-volatile memory in a portable device) into system program memory for execution. The bootloader then passes control to this operating system code.

BRIEF SUMMARY OF THE INVENTION

It is an object of this invention to provide a computer system including a bootloader that ensures the integrity of the operating system upon reset or powerup.

It is a further object of this invention to provide such a computer system in which security key techniques are used to confirm operating system authenticity.

It is a further object of this invention to provide such a computer system in which attempts to modify protected software can be detected and blocked.

It is a further object of this invention to provide such a computer system in which the secure bootloader functionality can be implemented in a manner that is transparent to the operating system.

Other objects and advantages of this invention will be apparent to those of ordinary skill in the art having reference to the following specification together with its drawings.

The present invention may be implemented into a computer system by way of a bootloader and security support logic, for example a security state machine, that operates in combination with the central processing unit. A read protect register is controlled to permit access to a security key on powerup, and then to deny access to this key to protect its secrecy. Write-protection registers store the physical program memory addresses of program code, including security-related functions, that are not to be overwritten. On-chip shadow memory, preferably mapped within the general purpose memory space, is available for use by secure applications running under the operating system of choice. The security support logic monitors physical addresses of the executing programs, and permits authenticated secure applications to access the shadow memory in lieu of the general purpose memory.

BRIEF DESCRIPTION OF THE SEVERAL VIEWS OF THE DRAWING

FIG. 3 is a memory map diagram illustrating the mapping of the shadow memory into system memory space.

FIG. 4 is a flow diagram illustrating a method of securing the computer system of FIG. 1, as performed by the central processing unit and security logic circuitry of FIG. 2, according to the preferred embodiment of the invention.

DETAILED DESCRIPTION OF THE INVENTION

The present invention will be described in connection with a preferred embodiment, applied to a generic computer platform. It is contemplated that this invention may be beneficially used in connection with computer systems over a wide variety of platforms, including conventional computers and workstations, portable (laptop or notebook) computers, and personal digital assistants (PDAs). In addition, it is further contemplated that this invention may be particularly beneficial to other types of electronic systems that are not commonly referred to as computers in the classic sense, but which are still based on a computer or microprocessor platform. Such other types of systems include wireless telephone handsets, internet appliances, web pads, biometrics, medical devices and the like. It is contemplated that those skilled in the art having reference to this specification will be readily able to implement this invention into these and other computer system platforms, without undue experimentation, and adapted as best suited for the particular function of the implementing system. It is therefore to be understood that this description is provided by way of example only, and is not intended to limit the true scope of the invention as claimed.

Figure 1:
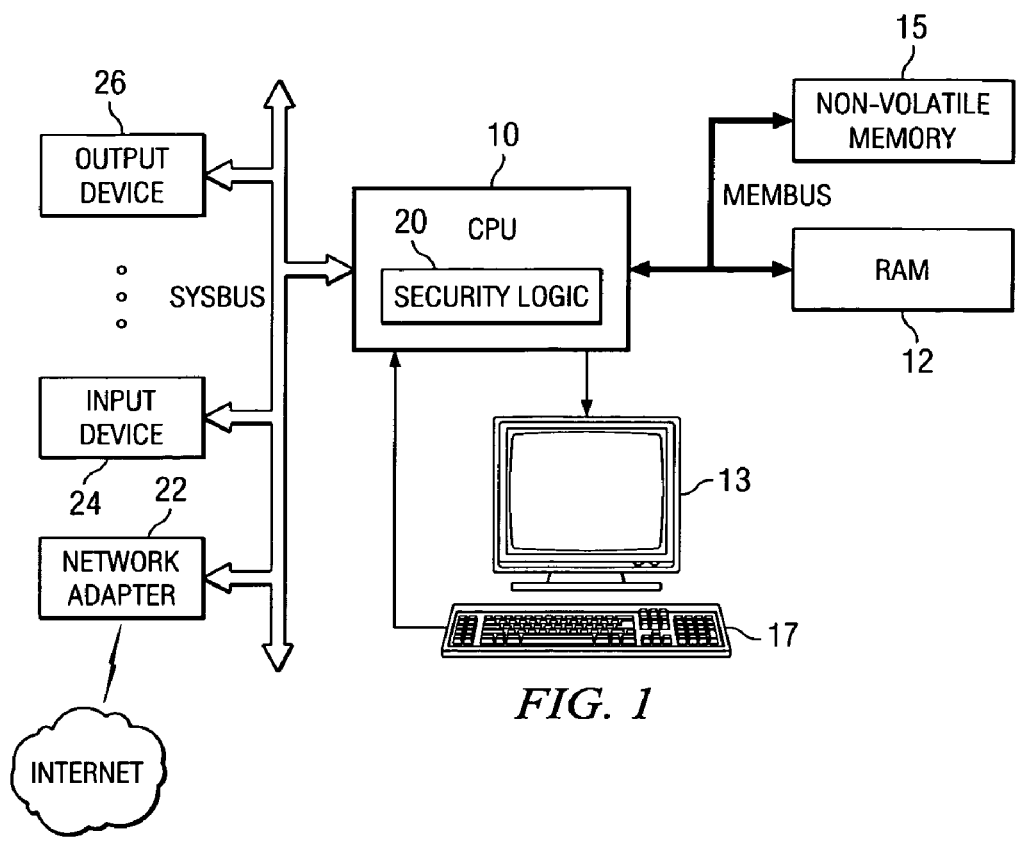
FIG. 1 is an electrical diagram, in block form, of a generic computer system in which the preferred embodiment of the invention is implemented.

FIG. 1 illustrates an exemplary computer system into which the preferred embodiment of the invention is implemented. In this generic architecture, the system is based around central processing unit (CPU) 10. CPU 10 is a programmable microprocessor or digital signal processor (DSP), depending upon the particular application of the system. The computational capacity of CPU 10 will depend upon the particular tasks to be performed by the system in its intended uses. An example of a suitable implementation of CPU 10 is the OMAP dual-core processor available from Texas Instruments Incorporated, which combines a TMS320C55x™ DSP core and an enhanced ARM925 processor. Other conventional microprocessors can of course also serve as CPU 10.

In this architecture, CPU 10 is coupled to random access memory (RAM) 12 and non-volatile memory 15 via memory bus MEMBUS. RAM 12 may be dynamic RAM (DRAM), static RAM (SRAM), or the like, serving as volatile memory storage during the operation of the system. On the other hand, non-volatile memory 15 may be implemented as read-only memory (ROM), either mask-programmable or electrically-alterable such as flash EEPROM, as persistent SRAM, as a disk storage device, or a combination of these and other implementations of non-volatile data storage. The particular implementation of non-volatile memory 15 will, of course depend upon the particulars of the system itself. Conventional desktop or laptop computer systems will include a hard disk drive as at least part of non-volatile memory 15, while other systems such as PDAs, wireless handsets, and the like will rely on solid-state memory for non-volatile memory 15. In the example described in this specification, non-volatile memory 15 stores program code, including the operating system code, for the computer system. As will be evident from the following description, at least a portion of non-volatile memory 15 is preferably implemented on-chip with CPU 10 and security logic 20.

Basic peripheral devices are coupled to CPU 10. In FIG. 1, keyed input device 17 is coupled to CPU 10, implemented in a form corresponding to the particular system application (e.g., as a keyboard for a computer workstation, as a keypad for a wireless handset, as a graphics tablet for a PDA). Keyed input device 17 is typically coupled to CPU 10 or otherwise into the system by conventional interface circuitry (not shown), such as a keyboard interface or UART (Universal Asynchronous Receiver Transmitter). Display 13 is also coupled to CPU 10, typically through some sort of graphics adapter (not shown). The particulars of display 13 will also depend upon the system application, and may range from a full computer monitor or flat panel display for a computer workstation, to a limited size monochrome LCD for wireless handsets and PDAs.

Additional system functionality is also implemented into this exemplary generic computer system of FIG. 1, by way of system bus SBUS, to which CPU 10 is coupled by a conventional bus interface function (not shown). Examples of such additional functionality include input device 24 and output device 26 coupled to system bus SBUS. Each of devices 24, 26 in FIG. 1 represents a desired peripheral device, again depending upon the system application and use. Also according to this example, network adapter 22 is also coupled to system bus SBUS, to provide connection between the computer system and an external network. As known in the art, network adapter 22 may be an adapter for various types of networks, including an Ethernet or other local area network type, a wireless network (e.g., IEEE 802.11), a cellular wireless service, or the like.

In this exemplary computer system, the computer system includes security logic 20, which is coupled to and operates in combination with CPU 10, and is preferably implemented on-chip, in the same integrated circuit, as CPU 10. As mentioned above, a conventional bootloader sequence typically loads user code (e.g., operating system code) from non-volatile memory 15 into RAM 12, and transfers control to that user code. According to this invention, the secure bootloader functionality implemented by way of CPU 10, security logic 20, and program instructions stored in a portion of non-volatile memory 15, operates to authenticate the user code for secure applications to be loaded into RAM 12 upon reset or power-up. In addition, by way of a write-protection function, security logic 20 ensures that the authenticated code is not further altered after it has been loaded into system RAM 12. In summary, according to this invention, system security is maintained by ensuring that security-sensitive data and code are protected from alteration or unauthorized snooping by a malicious virus or electronic intruder.

Figure 2:
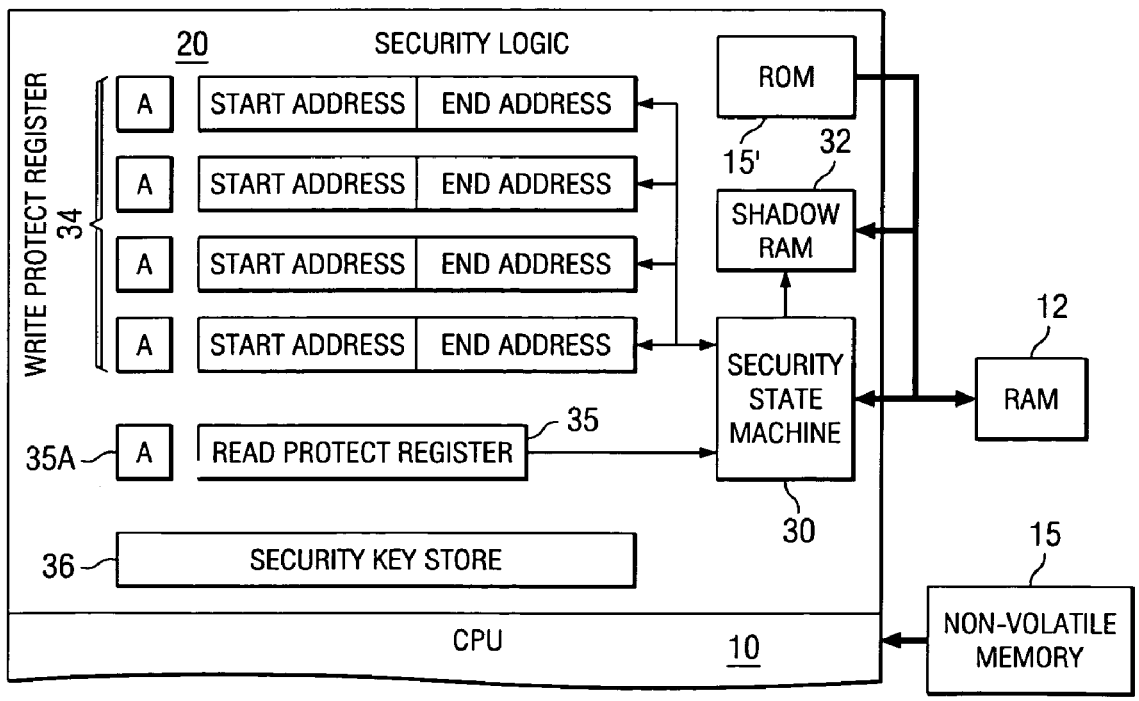
FIG. 2 is an electrical diagram, in block form, of a central processing unit and security logic circuitry according to the preferred embodiment of the invention.

FIG. 2 illustrates the construction of security logic 20 within CPU 10 and in combination with other system functions according to the preferred embodiment of the invention. As shown in FIGS. 1 and 2, security logic 20 is implemented as logic circuitry that is on-chip with CPU 10, implemented into the same integrated circuit. This arrangement is preferred so that the signals communicated between security logic 20 and the remainder of CPU 10 cannot be readily monitored, for example by way of a human "hacker" using a logic analyzer. The particular coupling between security logic 20 and CPU 10 is not shown, as those skilled in the art having reference to this specification will be readily able to arrange the communication and control between these two functions in the manner appropriate for a given implementation.

In this embodiment of the invention, security logic 20 includes security state machine 30, which controls the operation of security logic 20 in its bootloader functionality. Security state machine 30 is preferably implemented as sequential logic for performing the specific functions that are described below. It is contemplated that those skilled in the art having reference to this specification will be readily able to arrange the sequential logic of security state machine 30 to perform these functions, using the technology available for a particular application. Further in the alternative, security state machine 30 may be implemented by way of combinational logic, or by way of a sequence of instructions executable by programmable logic, as desired for the application.

Preferably, ROM 15' is a portion of non-volatile memory 15 that is implemented on-chip, in the same integrated circuit, with security logic 20 and CPU 10. According to the preferred embodiment of the invention, ROM 15' includes at least a portion of the secure bootloader program instructions to be executed by CPU 10 in cooperation with security logic 20, especially on system reset (including power-up) as described below. This on-chip implementation of ROM 15' prevents the physical snooping of bootloader addresses and data, as can be carried out by way of a logic analyzer or the like. Either the entire secure bootloader sequence can be stored within ROM 15', or alternatively secure portions of the bootloader can be stored within ROM 15', with these portions calling other bootloader instructions that are resident in external portions of non-volatile memory 15.

Security logic 20 includes security key store 36, as shown in FIG. 2. Security key store 36 is a memory resource that stores a secret key value, by way of which the operating system user code can be verified. Various key-based security approaches are known in the art, and may be used in this embodiment of the invention by way of security keys 36. One such technology is referred to as public key security. In this technology, a block of program code or data is encrypted or encoded by an algorithm that uses a public key, and is decrypted or decoded by the application of a private key. In this technology, the private key is not required for encrypting or encoding, but only the decryption algorithm requires the private key. Examples of public key algorithms include the RSA, ECC, and Ntru algorithms known in the art. According to another approach, a "secret" key is used to both encode or encrypt and decode or decrypt the data or program code. In either case, the private or secret keys are stored in security key store 36. Security key store 36 is preferably a hard-wired store of the key information, for example by way of a mask-programmable or hard-wired arrangement, or by way of a fuse-programmable register in which the key is hard-coded during manufacture.

Read protect register 35, with activation flag 35A, are also provided within security logic 20, to read-protect security key store 36. In addition, read protect register 35 may be utilized to read-protect other portions of memory (e.g., in non-volatile memory 15). Read protect register 35 itself stores an indication of the location and size of a read-protected block within the memory space of the system, while activation flag 35A is effectively a flag that indicates whether read protection is enabled or disabled. When enabled by activation flag 35A, read access (and necessarily write access) to the portion of the memory space corresponding to the contents of read protect register 35 is blocked. According to this embodiment of the invention, security key store 36 is at least implicitly within the read protection of read protect register 35.

Security logic 20 also includes write protect registers 34. According to this embodiment of the invention, multiple instances of write protect register 34 are included, each for enabling write protection of a different block of the system memory space. As shown in FIG. 2, each write protect register 34 includes a beginning address and an end address portion, to identify the beginning and ending physical addresses of a portion of the system memory space that are to be protected from being overwritten. Each write protect register 34 also includes an activation flag A that indicates whether write protection for the memory region in the beginning address and an end address portion is enabled or disabled. This write-protection function ensures that the authenticated code cannot be altered once it is loaded into system RAM 12. In addition, the contents of write protect registers 34 also identify the secure applications during the operation of the system, as will be described below.

Preferably, each of read protect register 35 and write protect registers 34 are implemented, at least in part, as write-once stores. The construction of write-once stores, or registers, is well known in the art; for example, conventional write-once stores include a latch or other device that changes state upon the writing of a register, and prohibits the altering of the contents of that register in subsequent operation, generally until a complete system reset. It is contemplated that either the entirety of read protect register 35 or write protect registers 34 (or both) may be write-once stores, or alternatively at least the activation flag portions of these registers may be implemented as write-once stores.

Security logic 20 further includes shadow RAM 32, which is a block of RAM having an address range mapped to a corresponding portion of the system memory space. FIG. 3 illustrates an exemplary system memory map, referring to physical memory addresses in the system. As evident from FIG. 3, a low address space portion is occupied by the contents of non-volatile memory 15. Much of the remainder of the address space is available as general purpose memory space. Shadow RAM 32 corresponds to a portion of system memory space that is made available to secure applications, which are indicated by the physical memory address of their instruction codes as residing within the write-protected memory space specified by the contents of write protect registers 34. In some applications, multiple portions of system memory may be made available to secure applications, within shadow RAM 32. Shadow RAM 32 may be managed according to conventional memory management techniques. Shadow RAM 32 thus provides a secure RAM used for execution of security functions.

As evident from FIG. 3, in normal system operation, security state machine 30 effectively watches the address lines of memory bus MEMBUS. During operation, security state machine 30 compares the physical memory address values corresponding to the current instruction being executed by CPU 10 (i.e., the physical address corresponding to the "program counter" of the current application) to the address ranges stored within write protect registers 34. If the current instruction being executed is within the write-protected address space, security state machine 30 concludes that the corresponding application is a secure application. Security state machine 30 then issues a chip select signal on line SECURE SELECT to enable that secure application to access shadow RAM 32 for storage or retrieval of its current results. If the application is not a secure application, indicated by the physical memory address of the current instruction being outside of the ranges specified by write protect registers 34, then the chip select signal on line SECURE SELECT grants access to normal system RAM 12 in the general purpose address space, and denies access to shadow RAM 32. In each of these cases, the addresses monitored by security state machine 30 are physical memory addresses.

In addition to this protection of shadow RAM 32 from access by nonsecure applications, write protect registers 34 are also used to protect the corresponding portions of system memory space that contain authenticated program code from alteration. As mentioned above and as will be apparent from the following description, write protect registers 34 store the beginning and ending addresses of portions of the system memory space that correspond to the program instructions for secure applications, specifically those applications that have been authenticated. Security state machine 30 (either itself, or in combination with CPU 10) interrogates write protect registers 34 with each physical memory address that CPU 10 wishes to write in the memory space, and blocks writing to memory in the event that the memory address lies within the address range stored in write protect registers 34.

Referring now to FIG. 4, the operation of security logic 20 in combination with CPU 10 and the remainder of the system, according to the preferred embodiment of the invention, will now be described in detail. This operation is initiated from a reset of the system following power-up of the system, or upon a system reset (either hardware or software). Preferably, the system initializes with all interrupts disabled, to prevent unauthorized interrogation of the system prior to the enabling of the secure bootloading functions. According to this preferred embodiment of the invention, the secure bootloader is a bootloader with the additional functionality of authenticating program code as required, and then loading that code if authentication is successful.

In process 40, the security keys are retrieved from security key store 36. As mentioned above, security key store 36 may be a memory location within the address space, or alternatively a hard-wired register that is either writable or hard-coded (hardwired, or fuse-programmable). Once the security keys are read in process 40, security state machine 30 then executes process 42 by activating read protection flag 35A, which read-protects security key store 36. The location of security key store 36 is indicated by the contents of read protect register 35. Process 42 thus ensures that the retrieved security keys cannot be again read in the operation of the system, as may otherwise be attempted by malicious code.

The securely retrieved security keys are now available for use by the secure bootloader in code verification. In decision 44, security state machine 30 begins the bootloading process, by determining whether a block of user code to be loaded from non-volatile memory 15 is a secure application. If not (decision 44 is NO), the user code block is loaded into RAM 12 in the conventional manner, in process 52.

On the other hand, according to this embodiment of the invention, if the user code block is connected with a secure application (decision 44 is YES), authentication of this user code block is next performed by CPU 10 in process 46, using the retrieved security keys that were read in process 40. The particular authentication steps performed in process 46 will depend upon the particular authentication process used. The authentication process 46 will now be described.

In one contemplated implementation of this invention, the user code block is signed with a secret key that is to match the security key stored in security key store 36. In this approach, authentication process 46 amounts to a matching of signature signed by the security key that is read from security key store 36 with the hash of the user code block, this signature being symmetric to the security key value. According to this secret key approach, the security is effected by read-protection register 35, which prevents CPU 10 or other functions from accessing security key store 36. In addition, the code and integrated circuit manufacturer can manufacture customer-specific devices, each with a different key (or seed from which the security key is generated), to ensure that other integrated circuit customers cannot create a program image from the other customer's application.

This preferred embodiment of the invention also contemplates the public-private key authentication of the user code block, and indeed its decryption if stored in non-volatile memory 15 in an encrypted form. Examples of conventional public/private key algorithms known in the art include the well-known RSA, ECC, and Ntru algorithms. Using this technology in connection with the preferred embodiment of the invention, either a signature attached to the code or the code itself is encrypted using a public key, but the signature or code is decrypted by application of the appropriate decrypting algorithm with the private key corresponding to the public key. According to this implementation, in authentication process 46, the decoding and decrypting of a signature or of the entire code block itself is carried out by the decrypting algorithm using the security key read from security key store 36 as the private key. The algorithm for performing this decryption is itself preferably contained within non-volatile memory 15, and the execution of this decryption algorithm is preferably fast enough to not unduly delay the system initialization process.

Further in the alternative, it is contemplated that security logic 20 can perform authentication process 46 using both secret key and public/private key authentication processes. Examples of secret key (or symmetric key) algorithms include the DES, 3DES, and AES algorithms. This dual implementation can enable such additional functions as itself encoding and encrypting program code and data files, the authentication of updates to secured program code, exchange of key values, and the like.

After authentication process 46, decision 47 is then executed by the secure bootloader to determine whether the authentication performed in process 46 was successful. If not (decision 47 is NO), then the user code block has been corrupted, either intentionally or by hardware failure. In either event, the user code block cannot be trusted for use in initializing the system, and the boot process has failed. The system is then shut down or locked up, as desired by the system designer.

If the authentication process 46 was successful (decision 47 is YES), then the user code block is presumed to be trustworthy. This trustworthiness is based on the code provider or the code itself corresponding to that as originally designed by the manufacturer or a trusted code vendor, and that the code block has not been altered from that originally written into the system. In process 48, security state machine 30 next stores, in one of write-protect registers 34, the beginning and ending addresses to which this the identified code block will be copied in system RAM 12, and sets the associated write protect enable flag A. These stored addresses are preferably the physical addresses of system RAM 12 to which the code block will be written. This write protection ensures that the operating system will use only authenticated code in its system operation, and thus prevents malicious code from altering authenticated program code; in addition, as described above, these address ranges are used by security state machine 30 to identify secure applications for determining whether access is to be granted to shadow RAM 32.

It is preferred that the system maintain a database of the user code that has been successfully authenticated. According to this preferred embodiment of the invention, in process 50, CPU 10 stores an identifier of the authenticated user code block in a location of system memory, as an entry into a database of the secure code. The list of authenticated code can then be read by CPU 10 or another function in the system, as desired or necessary for system management, diagnostics, and the like.

In process 52, CPU 10 then loads the user code block (which may or may not have been decrypted in process 52, depending on the security algorithm and scheme) into system RAM 12, at the addresses corresponding to those loaded into the appropriate write protect register 34 in process 48. This user code block is then ready for use by CPU 10.

In decision 55, after the loading of a code block into RAM 12 (whether secure or not), the executed secure bootloading process then determines whether additional user code blocks are to be loaded. If so (decision 55 is NO), control returns back to decision 44, in which the secure nature of the next user code block is determined, and the process is repeated. If no additional user code for the secure bootloading process remains to be loaded (decision 55 is YES), then control passes to process 56 where the system is prepared for normal operation.

In process 56, the other write protection registers 34 that are not associated with authenticated user code blocks are disabled, by the setting of the write protection enable flags A accordingly. This disabling of unused write protection registers 34, preferably in the form of write-once registers, prevents non-secure applications from capturing a write protect register 34 for its own use, and masquerading as a secure application (and thus having access to shadow RAM 32). Interrupts are again enabled in process 58, permitting CPU 10 to function in its normal manner. Control is then passed to the operating system in process 60. Normal system operation then commences.

As mentioned above, the protection provided by this preferred embodiment of the invention continues during normal operation. CPU 10 is not permitted to write to the portions of system memory space that are write-protected by write protect registers 34, so that program code for secure applications cannot be altered or corrupted, for example by malicious code, viruses, and the like. In addition, CPU 10 is prevented from accessing the security keys stored in security key store 36, by the function of read protect register 35 as enabled by activation flag 35A. In this manner, write-protect registers 34 and read protect register 35 function as control registers for CPU 10, in a security sense.

In addition, shadow RAM 32 provides a secure RAM region for use by secure applications only. Non-secure applications do not have access to this portion of the memory space. The use of shadow RAM 32 according to the preferred embodiment of the invention is transparent to the operating system itself. In the absence of the shadow RAM, the operating system would have to track portions of the memory space that are unavailable to it, while also permitting access to this code by security functions. However, the shadow RAM according to this invention provides a transparent portion of the system memory space at which the security logic can execute its security applications using this code. Non-secure applications are permitted to access RAM 12 or other memory locations that have the same physical address as that used by secure applications.

Various alternatives and variations to the preferred embodiment of the invention are also contemplated. For example, the security logic and secure bootloader function of this invention may enable secure download of secure user code updates. This functionality may be provided by an authenticated block of program code being callable by the operating system, and that authenticates and protects the downloaded updates. Further in the alternative, the security logic can manage the access to various hardware resources based on a signed and/or encrypted certificate, in similar fashion as the permitted bootloading of authenticated software resources described above. Still further in the alternative, it is contemplated that multiple authentication algorithms can be implemented into the secure bootloader, with the selection among these algorithms made by the system integrator, for example by way of a fuse-programmable selection process, by way of a jumper setting or the like.

Even further in the alternative, modes of operation of the system may be selectable by way of an authentication algorithm, with different authentication codes (e.g., enabled by the system integrator, enabled by the customer way of a code provided by the system integrator to the customer), may be made available. According to this approach, the selection of the operating mode or set of modes can be made by a configuration file that itself is signed (and possibly encrypted), and authenticated by the secure bootloading routine according to the preferred embodiments of the invention.

According to this invention, improved secured bootloading is provided for a wide variety of systems. Implementation of this invention enables systems that use flash memory, or other electrically alterable memory, as the repository for user code to have the same security against malicious boot code alteration as systems that use hardwired, mask programmable, ROM for such boot code. In addition, this invention can be readily implemented in a way that is transparent to the operating system, improving the integration of this function with modern operating systems, as may be revised.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A computer system, comprising:
   a central processing unit;
   system memory, coupled to the central processing unit by way of a memory bus, the system memory comprising non-volatile program memory and random access memory, the program memory storing program instructions corresponding to a bootloader sequence comprising an authentication process for authenticating program code blocks; and
   security logic, coupled to the central processing unit and to the non-volatile program memory, and comprising:
      a security key store, for storing a security key used in the authentication process;
      a read protect register, for selectively preventing read access of the security key store;
      at least one write protect register for storing a memory address range corresponding to an authenticated program code block;
      a shadow memory; and
      security control logic, for comparing address values on the memory bus to the contents of the at least one write protect register, and for denying write access to system memory at memory addresses within the memory address range stored by the at least one write protect register;
   wherein the security control logic enables access to the shadow memory responsive to a memory address value of a program instruction being within the memory address range stored in the at least one write protect register.

2. The system of claim 1, wherein the read protect register includes an activation flag that indicates, when set, that read access is denied to the security key store.

3. The system of claim 2, wherein the at least one write protect registers each include an activation flag that indicates, when set, that write access is denied to the memory address range stored in the corresponding one of the write protect registers.

4. The system of claim 1, wherein the at least one write protect register comprises a plurality of write protect registers.

5. The system of claim 1, wherein the at least one write protect register is a write-once register.

6. The system of claim 1, wherein the security control logic and the central processing unit are implemented in the same integrated circuit.

7. The system of claim 6, wherein at least a portion of the non-volatile program memory is implemented in the same integrated circuit as the security logic and the central processing unit.

8. The system of claim 7, wherein the shadow memory is implemented in the same integrated circuit as the security logic and the central processing unit.

9. A method of performing a secure bootloading of a computer system, comprising the steps of:
   responsive to a reset of the computer system, reading a security key value from a location of the computer system;
   after the reading step, enabling a read-protect register to deny read access to the location from which the security key value was read;
   for a block of secure user code in system memory of the computer system, authenticating the block of secure user code using the security key value;
   responsive to the authenticating process being unsuccessful, stopping the bootloading;
   responsive to the authenticating process being successful, storing a memory address range for the secure user code block in a write protect register;
   then denying write access to addresses of system memory within the memory address range stored in the write protect register; and
   enabling access to a shadow memory responsive to a memory address value of a program instruction being within the memory address range stored in the at least one write protect register.

10. The method of claim 9, wherein the authenticating and storing steps are repeated for a plurality of blocks of secure user code;
    and further comprising:
       passing control to an operating system responsive to all of the authenticating steps being successful.

11. The method of claim 9, further comprising:
    enabling the write protect register to deny write access to the portion of system memory associated with the stored memory address range.

12. The method of claim 11, further comprising:
    after the authenticating step, loading the user code block into a portion of system memory corresponding to the stored address range.

13. The method of claim 9, wherein the authenticating step comprises:
    comparing the security key value to a symmetric key value associated with the secure user code block.

14. The method of claim 13, wherein the authenticating step comprises:
    decrypting a signature associated with the secure user code block using the security key value, where the signature was generated with a public key value with which the security key value is associated as a private key value.

15. The method of claim 13, wherein the authenticating step comprises:
    decrypting a signature associated with the secure user code block using the security key value, where the signature was generated with a secret key value.

16. The method of claim 9, wherein the authenticating step comprises:
    decrypting the user code block using the security key value, where the secure user code block was generated with a public key value with which the security key value is associated as a private key value.

17. The method of claim 9, wherein the authenticating step comprises:
    decrypting the user code block using the security key value, where the secure user code block was generated with a secret key value.

18. The method of claim 9, further comprising:
    responsive to the authenticating process being successful, enabling interrupts of the computer system.

19. The method of claim 9, further comprising:
    responsive to the authenticating process being successful, logging an identifier of the user code block into a database of secure code blocks.

* * * * *